(12) United States Patent
Manning et al.

(10) Patent No.: US 10,865,756 B2
(45) Date of Patent: Dec. 15, 2020

(54) ASSISTING A KICK STARTER FOR RELIABLE START AND SAFETY ON A MOTORCYCLE

(71) Applicant: John Alexander Manning, Essex Junction, VT (US)

(72) Inventors: John Alexander Manning, Jericho, VT (US); Nicholas Jackson Woodbury, Essex Junction, VT (US); William David Nicolay, Monkton, VT (US); John Harold Drew, Bethel, ME (US); Bryan Thomas Dooley, Colchester, VT (US); Brianna Weiss, Warwick, NY (US); Zachary Centerbar, Burlington, VT (US); Noah Tyler Briggs, Norwich, CT (US)

(73) Assignee: John Alexander Manning, Jericho, VT (US)

( * ) Notice: Subject to any disclaimer, the term of this patent is extended or adjusted under 35 U.S.C. 154(b) by 0 days.

(21) Appl. No.: 16/278,001

(22) Filed: Feb. 15, 2019

(65) Prior Publication Data
US 2019/0178216 A1 Jun. 13, 2019

Related U.S. Application Data

(60) Provisional application No. 62/351,109, filed on Jun. 16, 2016.

(51) Int. Cl.
| F02N 3/04 | (2006.01) |
| F02N 11/08 | (2006.01) |
| F16D 41/16 | (2006.01) |
| F01L 13/08 | (2006.01) |

(52) U.S. Cl.
CPC ............. *F02N 3/04* (2013.01); *F16D 41/16* (2013.01); *F01L 13/08* (2013.01); *F02N 11/0803* (2013.01)

(58) Field of Classification Search
CPC ........ F02N 3/04; F02N 11/0803; F16D 41/16; F01L 13/08
See application file for complete search history.

(56) References Cited

U.S. PATENT DOCUMENTS 6,637,395 B1 10/2003 Olson et al.

*Primary Examiner* — Hieu T Vo
(74) *Attorney, Agent, or Firm* — Paul Frank + Collins P.C.

(57) ABSTRACT

A start assist system is configured to generate torsion load on an crankshaft of a motorcycle. The configurations include a hub adapted to couple with a kick start lever on a motorcycle, a load generating unit, the loading generating unit adapted to generate torsion on the hub, and circuitry to regulate operation of the load generating unit in response to a position of the kick start lever. The torsion load operates to assist an operator to kick-start the machine.

19 Claims, 7 Drawing Sheets

ASSISTING A KICK STARTER FOR RELIABLE START AND SAFETY ON A MOTORCYCLE

CROSS-REFERENCE TO RELATED APPLICATIONS

This application claims the benefit of priority of U.S. Ser. No. 62/351,109, filed on Feb. 12, 2018, and entitled "ASSISTING A KICK STARTER FOR RELIABLE START AND SAFETY ON A MOTORCYLCE." The content of this application is incorporated herein by reference in its entirety.

BACKGROUND

"Vintage" motorcycles include machines built prior to 1980. These motorcycles often have a four-stroke engine that an operator (or "rider") starts with a kick-starter mechanism in lieu of an electric start (found on most modern bikes). The kick-starter mechanism typically includes a lever that the operator depresses with their foot to rotate a shaft that engages with a crankshaft on the engine (often via one or more gears).

Operators may find the kick-starter mechanism difficult or even dangerous to operate on some machines. Those with physical limitations may not generate enough force on the lever to overcome high compression, often at or greater than 7.5 to 1, that is common on single and dual cylinder engines in use on these machines. The high compression may require peak input torque at the input shaft in excess of 1000 in-lbs, often as high as 1,600 in-lbs. Further, the kick-starter mechanism may experience "kickback" near the end of a start cycle, which for a normal kick start is two to three compression strokes of a piston. Failure of the engine to start leaves the piston coming up on a compression stroke in the last part of the start cycle. Often the piston lacks enough angular momentum to continue past top dead center. For motors designed with advanced ignition (where a spark plug initiates a spark before top dead center of stroke of the piston), the spark plug may ignite fuel-air mixture in the cylinder prior to top dead center of the piston, causing the engine to "spin" in reverse and "kickback" the lever. Reversal of the lever in this way may cause fractures, rupture an Achilles tendon, or result in other serious lower leg injuries on the operator.

SUMMARY

The subject matter disclosed herein relates to improvements that augment the kick start mechanism on these vintage motorcycles. Of particular interest are embodiments that make the kick starter less difficult to operate and significantly reduces any risk of kickback. As noted more herein, the embodiments may comprise an appropriately sized pneumatic actuator that is attached via a chain coupling to the input shaft. The pneumatic actuator provides at least part of the torque necessary to kick start the engine. Should kickback occur, the pneumatic actuator prevents counter-rotation of the lever to avoid any abrupt, dangerous contact with the operator's leg.

DRAWINGS

Reference is now made briefly to the accompanying drawings, in which.

Figure 1:
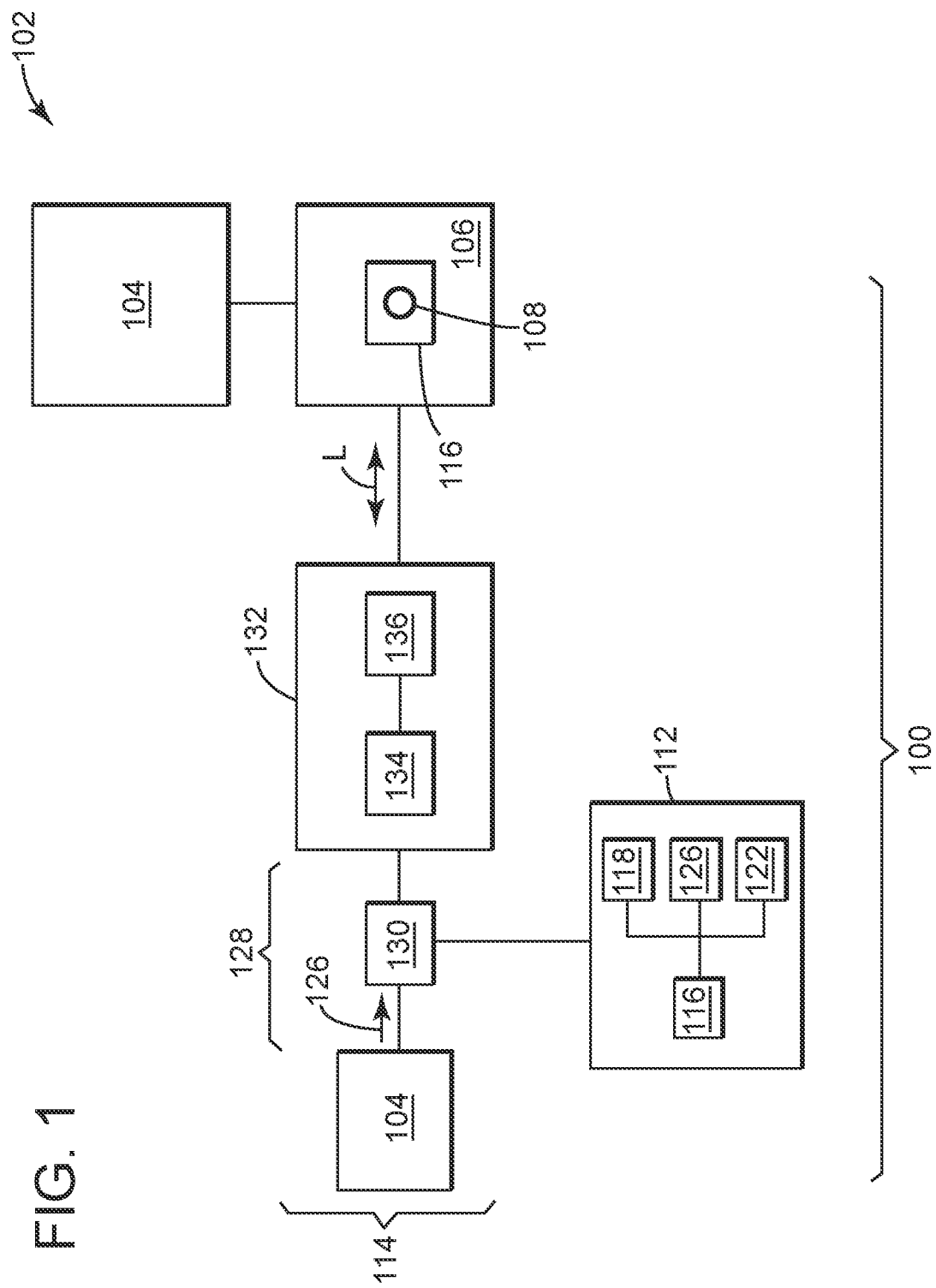
FIG. 1 depicts a schematic diagram of an exemplary embodiment of a start assist system.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

The discussion below describes embodiments of a kick-assist solution to address problems with kick start mechanisms on vintage motorcycles. These embodiments work in conjunction with structure for the kick starter mechanism that exists on these machines. On board controls integrate into existing electrical systems to provide safety interlocks to "arm," "ready," and "activate" the device long enough for an operator to actuate the lever on the kick start mechanism. For safety, the device remains "active" to prevent counter-rotation of the lever due to kickback.

FIG. 1 depicts a schematic diagram of an exemplary embodiment of a system 100. The embodiment is shown as part of a motorcycle 102, but might find use in other applications as well. The motorcycle 102 may include an engine 104 that couples with a kick start mechanism 106 (or "kick starter 106"), often at the crankshaft on the engine 104. The kick starter 106 may include an input shaft 108 and a lever 110. The input shaft 108 couples with the crankshaft, typically via one or more gears (not shown). As also shown, the start assist system 100 may include a control unit 112 that operates a load-generating unit 114 that generates a torsion load L on the input shaft 108. The control unit 112 may have circuitry 116 that couples with a switch unit 118, a sensor unit 120, and a starter unit 122. The load-generating unit 114 may have a source unit 124 that delivers a signal 126, like pressurized air. The pressurized air 126 may transit a fluid circuit 128 with a valve 130 to a start assist unit 132. The signal 126 may energize an actuator 134 that couples with a force coupling unit 136 to generate the torsion load L.

At a high level, the start assist system 100 is configured to augment use of the kick starter 106 to reliably start the motorcycle 102. These configurations may convert an input, like pneumatic signal 126, to the torsion load L on the input shaft 108. This torsion load L ensures that appropriate torque is available on the input shaft 108 to turn-over the engine 104. As an added benefit, the design can maintain the torsion load L on the kick starter 106 to prevent reversal, or kickback, synonymous with rapid return of the lever 110 that can injure the operator.

Circuitry 116 may be configured for data and signal processing. These configurations may leverage discrete, electrical components (e.g., resistors, transistors, etc.) and computing components, like processors, micro-controllers, and the like. Packaging may vary, but it may benefit the design to use printed circuit board(s) (PCBs) of appropriate construction. In operation, circuitry 116 may operate valve 130 in response to one or more inputs to allow pneumatic signal 126 to impinge on the actuator 134.

The switch unit 118 may be configured to engage or "arm" the system 100 to augment kick start functions on the motorcycle 102. These configurations may include actuatable devices, like switches, buttons, and toggles. These devices arm, disarm, or engage one or more components of the system 100. Indicators, whether audible or visual, may also find use here to provide the operator with appropriate instructions to activate the system 100.

The sensor unit 120 may be configured to provide feedback to operate the system 100. These configurations my include devices that function to measure or monitor certain parts of the system 100. The devices may include sensors, like Hall Effect sensors or magnetic proximity sensors; however this disclosure contemplates use of many technologies to monitor or measure components of the system 100.

The starter unit 122 may be configured to energize the system 100. These configurations may operate in response to an ignition switch, or like device, found on the motorcycle 102.

Figure 2:
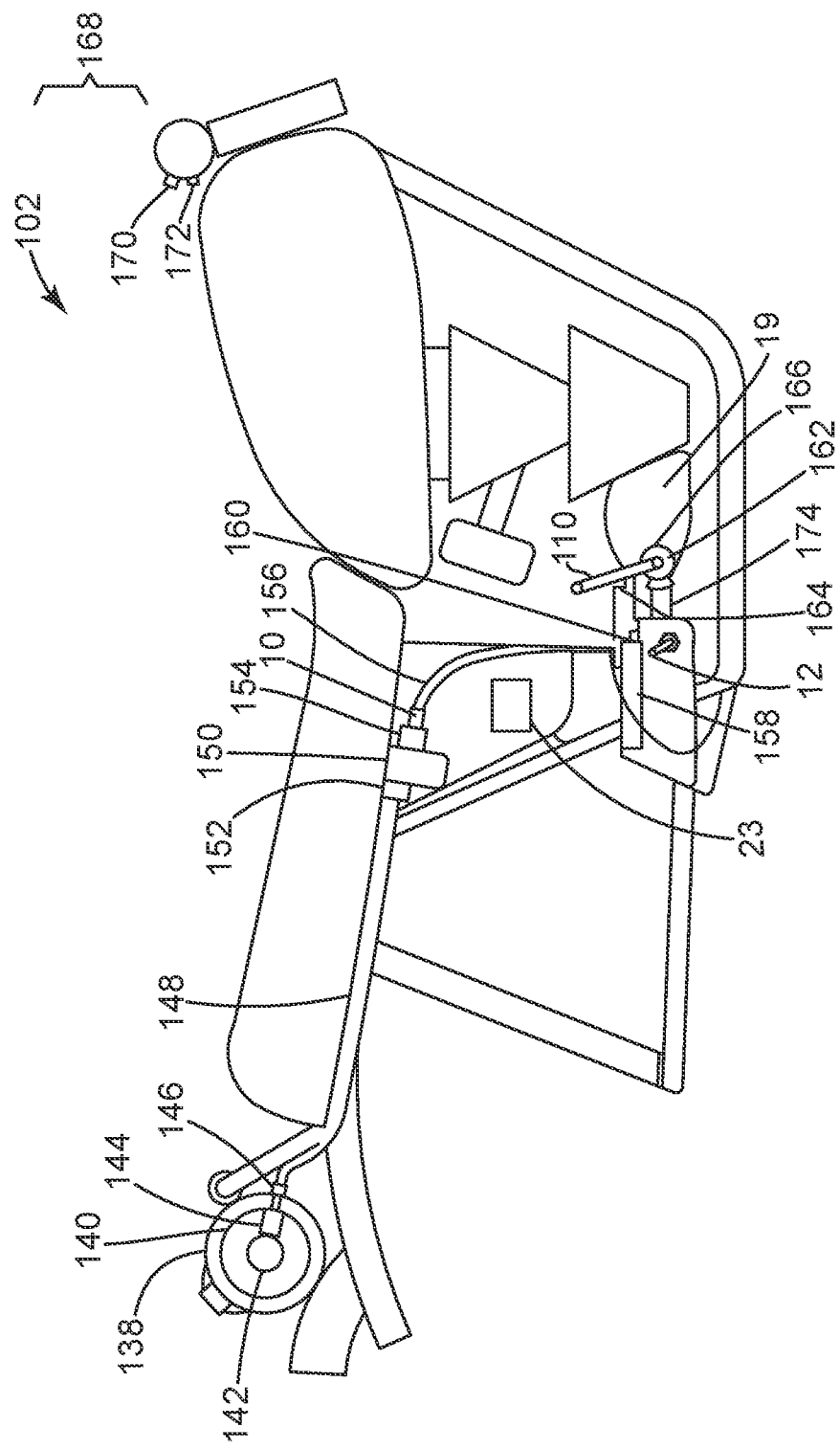
FIG. 2 depicts an elevation view from the side of an example of the start assist mechanism of FIG. 1.

With reference also to FIG. 2, the start-assist system 100 may be configured to install on the motorcycle 102. These configurations may embody a kit or collection of parts that install with no permanent modifications to the motorcycle 102. The system 100 may utilize power available on the machine, typically 12 Vdc, with current draw under 2 A to foreclose the need to modify any electrical systems found on the motorcycle 102. Wires and cables may attach to any structure of the motorcycle 102. Fasteners, like zip-ties, may be useful for this purpose. In use, the control structure, including the control unit 112 and the valve 130, will energize in response to change of state of an ignition switch on the motorcycle 102, from OFF to ON.

The source unit 124 may be configured to provide the pneumatic signal 126 at operating pressures sufficient to generate torsion load L on the input shaft 108. These configurations may include devices to generate operating pressures for the pneumatic signal 126 in a range of from 70 psi to 120 psi. In one implementation, the source unit 124 may include a container 138 that retains an on-board air bottle 140. Examples of the container 138 may form an enclosure, like a bag or satchel. This enclosure may affix to structure of the motorcycle 102. Preference may locate the enclosure towards the back of the machine, as shown in FIG. 2, which may be out of the way of the operator and any passenger on-board the motorcycle 102. The on-board air bottle 140 may be configured to hold and discharge enough pressurized air for 60 to 160 start "attempts" depending upon its size (50 cu-in. to 92 cu-in, respectively) and initial charged pressure. For example, these configurations may be charged to 4,500 psi. Notably, this disclosure does also contemplate use of "off-board" supply, like a hose that connects with a local compressor that supplies "shop air." This off-board supply allows an unlimited number of start attempts (in proximity to the supply).

The fluid circuit 128 may be configured to deliver the pneumatic signal 126 at appropriate operating pressure. These configurations may include a pressure regulator with adjustments (e.g., high pressure adjustment 142 and low pressure adjustment 144). The adjustments 142, 144 may embody devices that thread (or couple) onto the air bottle 140. A connector 146 may secure the adjustments 142, 144 to an end of a supply line 148. For shop air, shop hoses may include a connector compatible with the connector 146. The other end of the supply line 148 may couple with a solenoid 150, typically with compatible connectors (e.g. a first connector 152 and a second connector 154). The solenoid 150 may embody a 3-way device (normally closed). The solenoid 150 may receive a supply line 156 to direct the pneumatic signal 126 to a pneumatic actuator 158, which couples to a bracket 160 that attaches to part of the motorcycle 102. As shown, the pneumatic actuator 158 may have a piston that couples with a hub 162, for example, by way of a chain drive. Examples of the chain drive may include a clevis-and-pin attachment 164 that couples with a chain 166, which engages the hub 162 about a portion of its periphery. This portion may be smooth or accommodate teeth, as desired. As noted herein, the hub 162 may couple with the input shaft 108 to transfer the torsion load L thereon. It may be benefit the design for the hub 162 to accommodate the lever 110 so as not to interrupt the original assembly of the motorcycle 102. In one implementation, the hub 162 may interpose between the lever 110 and the structure of the motorcycle 102.

The pressure regulator may be configured to set pressure of the pneumatic signal 126. The adjustments 142, 144 allow the system 100 to tune the torsion load L, for example, at initial installation of the system 100 on the motorcycle 102. For shop air, adjustments may occur at the shop source or supply to tune the torsion load L. Notably, the optimal torsion load L may depend on peak compression of the motor (older motors have lower compression due to wear, for example) and how much assist the operator desires based upon perceived kick force.

When pressurized, the pneumatic signal 126 will measure at the solenoid 150. It may benefit the design for the second connector 154 to mate to a vent side of the solenoid 152 so that the piston may move freely in the pneumatic actuator 158. Examples of the pneumatic actuator 158 may also contain a return spring to provide a low, constant tension on the input shaft 108 regardless of whether or not the pneumatic signal 126 is present in the system 100. The tension may counter loading in the kick start mechanism 106 that may result from a leaf spring or similar resilient element. This feature allows an operator to use the lever 110 to kick start the motorcycle 102, in normal fashion, with the system 100 "off" or when pneumatic signal 126 does not impinge on the solenoid 150.

Figure 3:
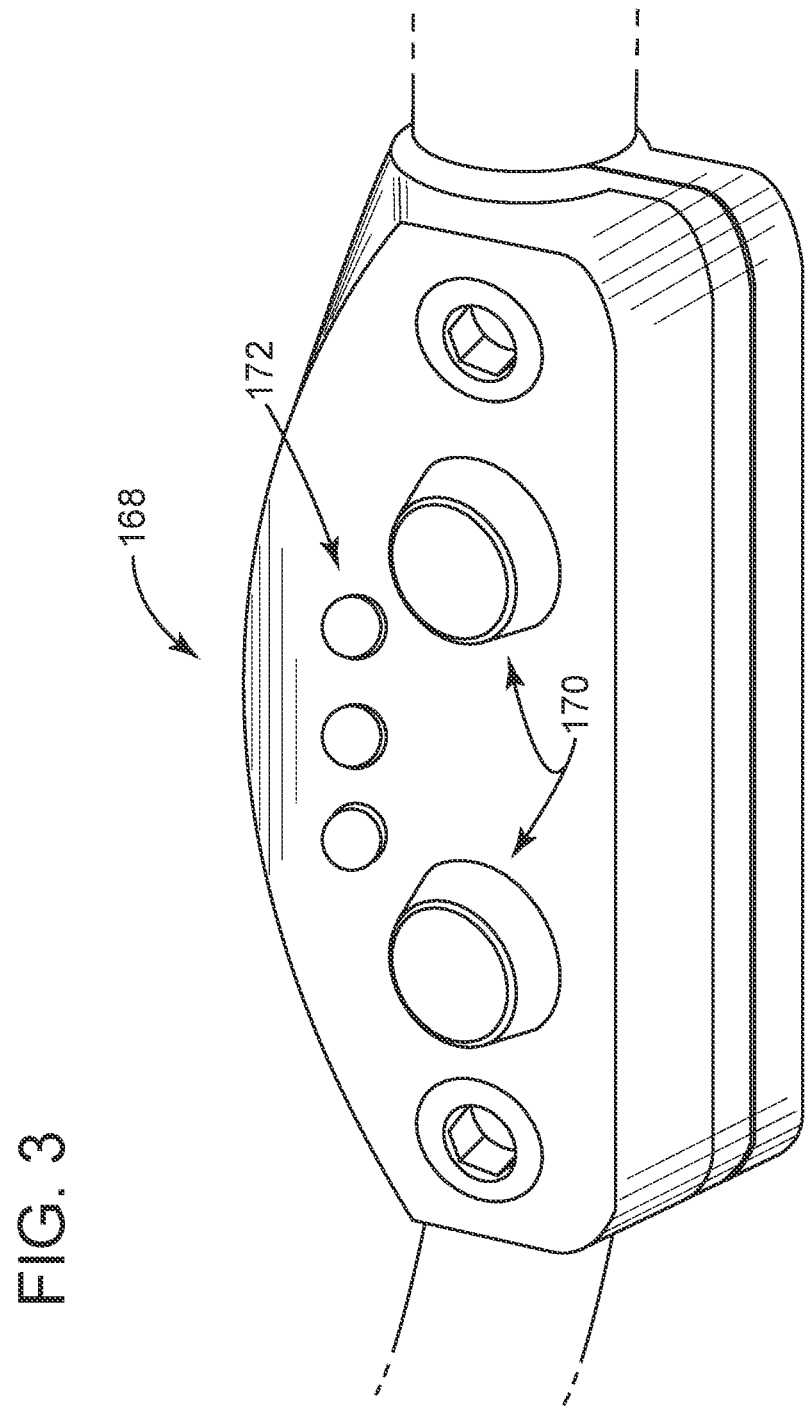
FIG. 3 depicts an image of an example of a control unit for the start assist mechanism of FIG. 1.
Figure 4:
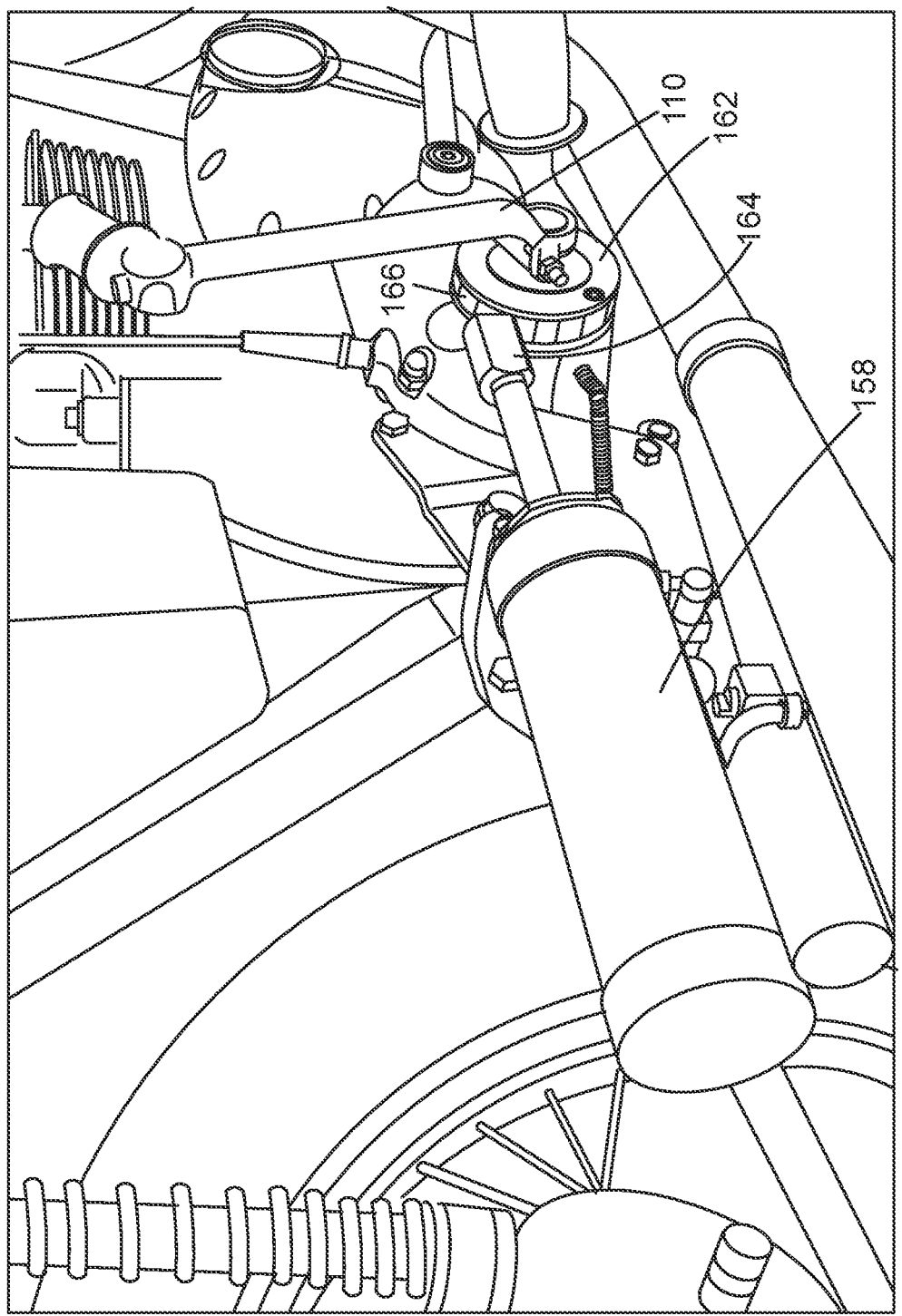
FIG. 4 depicts an image taken from the back, side of an example of structure for the start assist mechanism of FIG. 1.
Figure 5:
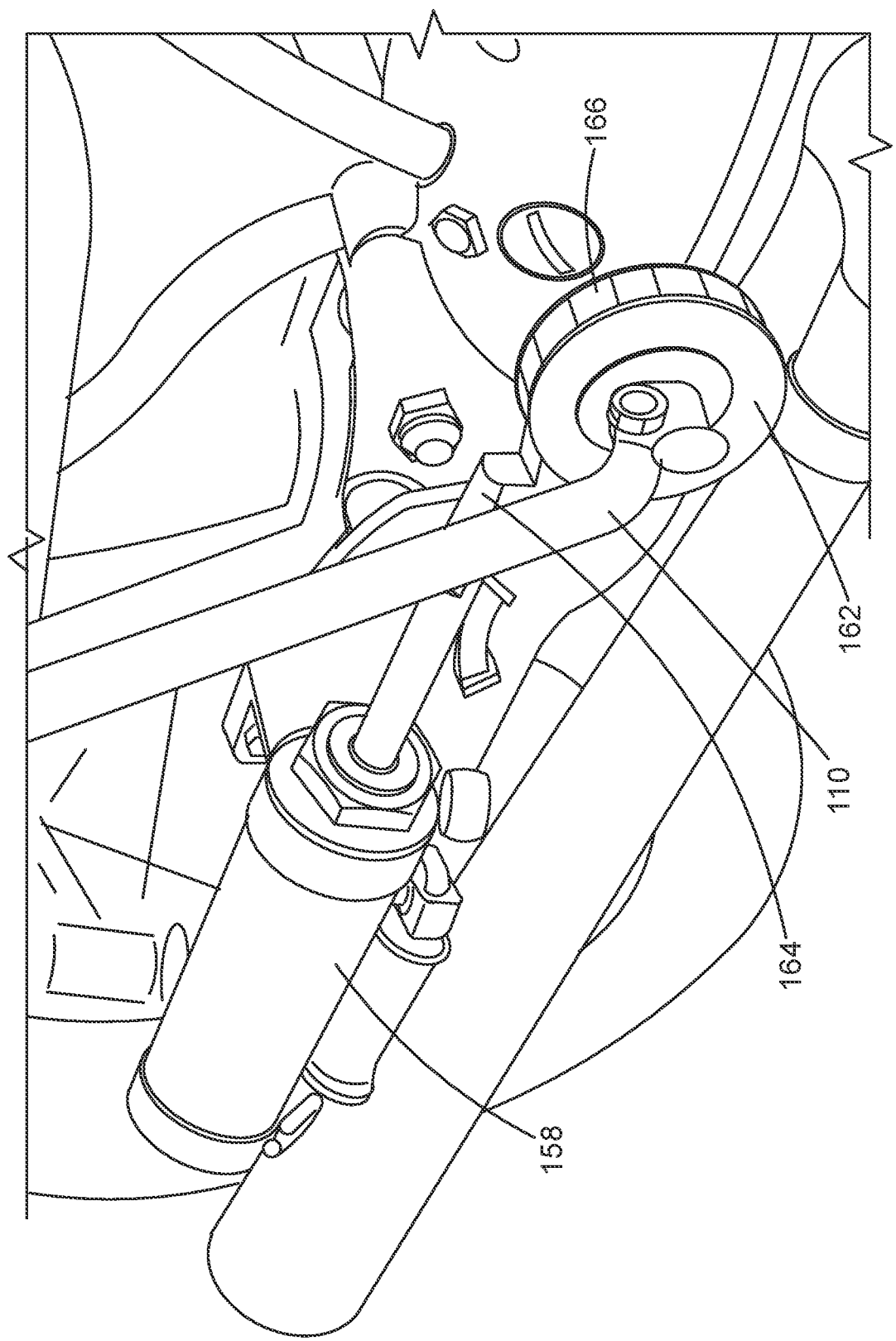
FIG. 5 depicts an image taken from the front, side of the example of FIG. 4.

Referring also to FIGS. 3, 4, and 5, the discussion now turns to an exemplary method for operating the system 100 to kick start the motorcycle 102. One of the benefits of the proposed design is that it maintains the basic starting sequence for the motorcycle 102. This sequence may include steps to actively operate an ignition switch, a choke, and a throttle, among other components on the motorcycle 102. The system 100 requires no changes to settings and techniques outside of those necessary to allow the system 100 to generate the added torsion load L to the benefit of the operator. In one implementation, the system 100 may leverage a control unit 168 disposed proximate the handlebars on the motorcycle 102 to facilitate operation of the system 100. The control unit 168 may include switches 170 (e.g., pushbuttons) and indicators 172 (e.g., lights). A sensor 174 may be useful to monitor a position of the lever 110.

At start-up, the operator may actuate the ignition switch to its ON position. The operator may then actuate one of the switches 170 (or a "Master arm" switch) to energize the starter unit 120. Use of this switch may energize (or turn "ON") one of the indicators 172, for example, a "Master Arm" light. In one implementation, the system 100 may activate a counter to measure a "wait" period, for example, 30 seconds to receive a second input. If no second input is received before expiration of the wait period, the system 100 returns to its default, idle state with the Master Arm light turns "OFF."

The second input may indicate a "ready" position for the lever 110. This ready position may correspond with a nominal point where the engine cylinder in compression stroke is at peak compression, often where the lever 110 is at 30° to 60° degrees counter-clockwise from its static position. The hub 162 may be configured to orient the lever 110 clockwise 10 to 50 degrees (depending upon the type of motor 102) relative to the stock installation to provide more advantageous mechanical advantage for kick-starting the machine. In practice, the operator pushes down on the lever 110 to prepare to kick start the motorcycle 102. The hub 162 may be configured with a target, for example, a flange or tab that causes the sensor 174 to generate a "Ready" signal (or "Ready Position" signal). A "Ready" light among the indicators 172 may illuminate in response to the Ready signal. It may benefit the design for the target to interact with the sensor 174 concomitantly with the lever 110 in the ready position, preferably with the lever 110 rotated counter-clockwise or possibly beyond. As an added benefit, the ready position ensures that the operator's foot is firmly on the lever 110 before the system 100 applies pneumatic signal 126 from the solenoid 150 to the pneumatic actuator 158.

The operator may actuate one of the switches 170 (or a "Start" switch) on the control unit with the lever 110 in the ready position and the Ready light "ON." The Start switch may energize the pneumatic solenoid 150 to allow the pneumatic signal 126 to flow into the pneumatic actuator 158 to create a force (the "assist force"). The assist force may pull on the hub 162 to create the torsion load L. The mechanical advantage of the torsion load L may correspond with the design of the hub 162, for example, the radius where the chain 166 wraps around the hub 162, as well as pressure (of the pneumatic signal 126), and parameters of the piston, like effective piston area (piston less rod). Pressure is adjustable to regulate the assist force, as noted above. The period of pressurization may be time-limited depending upon the application, for example, from 5-10 seconds. The system 100 is configured for the operator to engage the kickstarter 106 to start the motorcycle 102 during this timeout period.

The system 100 may prevent kickback during the timeout period. The system 100 can pin the lever 110 in the down position for the balance of the timeout period to avoid counter-rotation into the operator's lower leg. Nominally, a nominal kick start sequence takes under 5/10 of a second. The timeout period may be set with sufficient safety margin beyond the time for the normal kick start sequence for the pneumatic actuator 158 and lines 148, 156 to form a resilient pneumatic cushion that absorbs the kickback energy.

Figure 6:
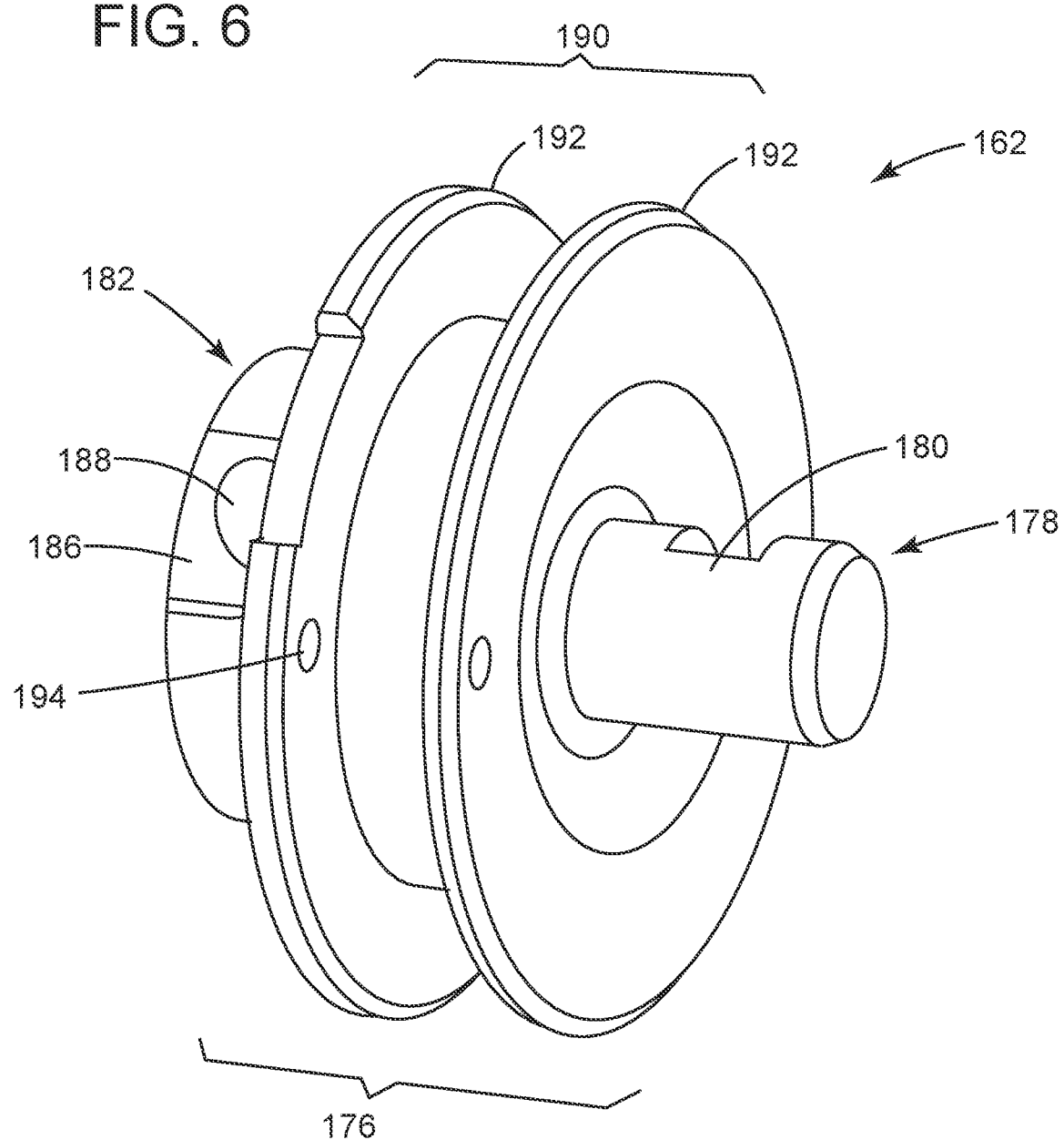
FIG. 6 depicts a perspective view of an example of a hub for use in the start assist mechanism of FIG. 4.
Figure 7:
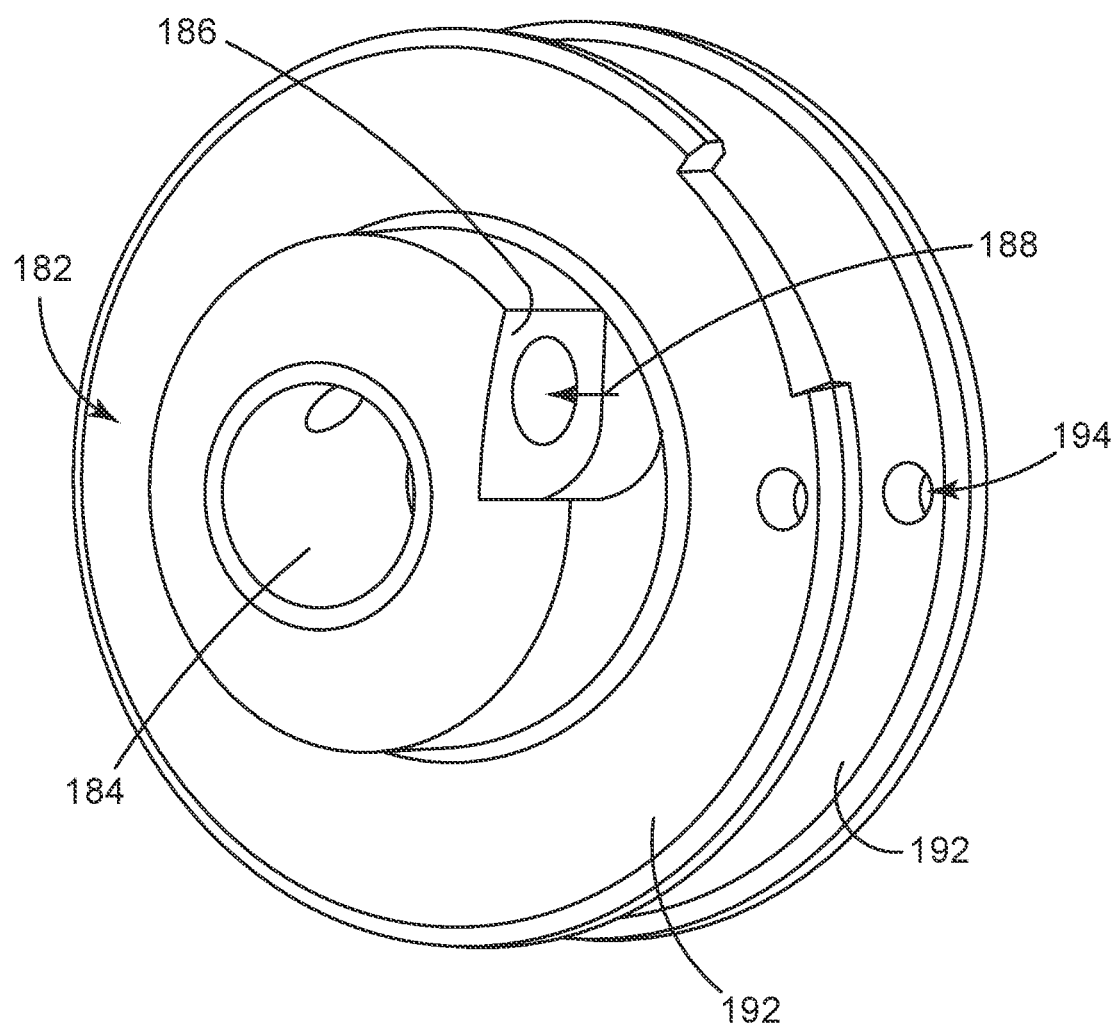
FIG. 7 depicts a perspective view of the hub of FIG. 6.

FIGS. 6 and 7 depict a perspective view of an example of the hub 162. This example may include a body 176, preferably made of metal or metal alloy. On one side, the body 176 may include a first boss 178 with a recess 180. The first boss 178 may be sized and configured to receive the kick start lever 110. A fastener may insert into the kick-start lever 110 and engage with the recess 180. This ensures the lever 110 locks into position and clocked with operative mechanics on the machine. The other side of the body 176 may include a second boss 182 with a bore 184. Dimensions for the bore 184 may receive the kick start shaft on the motorcycle 102. In one implementation, the second boss 182 may include a recess 186 with an aperture 188, for example, a through-hole to the bore 184. Fasteners may insert into the through-hole to engage with a recess or like receiving feature on the kick-start shaft. As also shown, the body 176 may include a flanged portion 190 with a pair of flange members 192. A through-hole 194 may penetrate the flange member 192. In use, chain 166 may fit between the flange members 192. A pin may extend through the chain 166 and the through-hole 194 to lock one end of the chain in position on the body 176.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:

1. A motorcycle, comprising:
   a kick start lever;
   a hub coupled with the kick start lever;
   a pneumatic actuator coupled with the hub;
   a sensor disposed in proximity to the hub and responsive to a position of the hub as actuated by the kick start lever,
   wherein the pneumatic actuator applies torsion load to the hub in response to a signal from the sensor that corresponds with rotation of the kick start lever.

2. The motorcycle of claim 1, further comprising:
   a chain coupled to the hub and the pneumatic actuator.

3. The motorcycle of claim 1, further comprising:
   an air cylinder coupled with the pneumatic actuator.

4. The motorcycle of claim 1, further comprising:
   an air cylinder;
   a pneumatic control system with a solenoid downstream of the air cylinder and upstream of the pneumatic actuator,
   wherein the solenoid opens and closes in response to the signal.

5. A kit, comprising:
   a hub adapted to couple with a kick start lever on a motorcycle;
   a load generating unit, the loading generating unit adapted to generate torsion on the hub; and
   circuitry to regulate operation of the load generating unit in response to a position of the kick start lever.

6. The kit of claim 5, wherein the load generating unit comprises a pneumatic actuator.

7. The kit of claim 5, wherein the load generating unit comprises:

a pneumatic actuator; and
a bracket adapted to mount to the motorcycle and to receive and support the pneumatic actuator.

8. The kit of claim 5, further comprising:
an air cylinder; and
a container adapted to mount to the motorcycle and to receive and support the air cylinder.

9. The kit of claim 5, further comprising:
a solenoid; and
a fluid circuit adapted to couple the solenoid to the load generating unit.

10. The kit of claim 5, wherein the load generating unit comprises a chain drive that attaches to the hub.

11. The kit of claim 5, further comprising:
a sensor adapted to generate a signal that corresponds with a position of the hub.

12. The kit of claim 5, further comprising:
a control unit adapted to mount to handlebars on motorcycle and to couple with the circuitry, the control unit comprising switches and lights.

13. The kit of claim 5, further comprising:
a chain; and
a pin,
wherein the hub comprises a body with a flanged portion having opposing flanges spaced apart to receive the chain and a through hole aligned on both flanges to receive the pin.

14. The kit of claim 5, wherein the hub comprises a body with a bore on a first side that is sized to receive a kick-start shaft on the motorcycle and a boss on an a second side that is sized to receive the kick start lever.

15. A method, comprising:
on a motorcycle having a kick start lever,
energizing an actuator in response to an input indicating a ready position for the kick start lever; and
transferring a load from the actuator to an input shaft that couples with a crankshaft on an engine.

16. The method of claim 15, further comprising:
applying the load to a chain that couples the actuator with the input shaft.

17. The method of claim 15, further comprising:
monitoring rotation of the lever; and
releasing a pneumatic signal to the actuator in response to the ready position.

18. The method of claim 15, further comprising:
energizing a solenoid to release a pneumatic signal to the actuator in response to the ready position.

19. The method of claim 15, further comprising:
receiving a first signal from a sensor that monitors rotation of the kick start lever to the ready position;
receiving a second signal from a switch; and
releasing a pneumatic signal to the actuator in response to both the first signal and the second signal.

* * * * *